Patented June 17, 1952

2,601,168

UNITED STATES PATENT OFFICE 2,601,168

Δ⁴-17α-METHYL-3,20-DIOXO-PREGNENE COMPOUNDS

Placidus A. Plattner, Zurich, Switzerland, assignor to Ciba Pharmaceutical Products, Incorporated, Summit, N. J., a corporation of New Jersey No Drawing. Continuation of application Serial No. 138,943, January 16, 1950. This application October 31, 1950, Serial No. 193,309. In Switzerland January 31, 1949

4 Claims. (Cl. 260—397.3)

This application is a continuation of my copending application Serial No. 138,943, filed January 16, 1950, now abandoned.

The present invention relates to new Δ⁴-17α-methyl-3,20-dioxo-pregnene compounds. More particularly, the invention has especial relation to Δ⁴ - 17α - methyl - 3,20 - dioxo - pregnene (17α-methyl-progesterone):

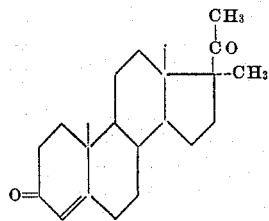

and to Δ⁴-17α-methyl-21-hydroxy-3,20-dioxo-pregnene (17α-methyl-desoxycorticosterone):

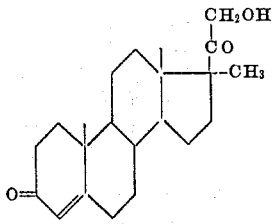

and its esters.

The designation "17α" means that the steric configuration of the new pregnene compounds at the carbon atom 17 is the same as that of Δ⁵ - 3β - hydroxy - 17α - methyl - aetio - cholenic acid methyl ester of melting point 162–163° C.

It has been found that these unsaturated Δ⁴-compounds are characterized by very good hormone activity. Thus, 17α-methyl-progesterone has a progestative action on estrone-pretreated mucous membrane of the rabbit uterus, which is even greater than that of the natural corpus luteum hormone. There have been described in the literature inactive saturated 17-methyl-pregnane compounds, such as 17-methyl-3,20-dioxo-pregnane and 17-methyl-3,21-dihydroxy-20-oxo-pregnane. However, unsaturated, highly-active pregnane compounds, i.e. pregnenes, such as those of the present invention, are not only new but their activity is unexpected and not at all to be foreseen.

The pregnenes according to the present invention are obtainable in a variety of ways. Thus, a halide of a 17α-methyl-aetio-cholanic acid which is saturated or unsaturated in ring A and contains, in the 3-position, an oxo or hydroxy group or a substituent which is convertible into an oxo or hydroxy group by hydrolysis, is reacted with a methylmetallic compound or diazo-methane. Double bonds which are present may be protected during such reaction. A substituent in the 21-position of the resultant compound may be replaced by hydrogen or by a free or esterified hydroxy group and a substituent in the 3-position which is convertible into an oxo or hydroxy group may be so converted at any stage in the process; a free hydroxy group in the 3-position may be oxidized to an oxo group; and if there is no double bond in the ring A, such a bond may be introduced into the 4,5-position.

In accordance with the invention, there is used as a starting material a halide of Δ⁴-17α-methyl-3-oxo-aetio-cholenic acid or Δ⁵-17α-methyl-3-hydroxy-aetio-cholenic acid, or of a corresponding compound wherein the double bond is protected. There may also be used, as starting materials, compounds which contain in the 3-position, instead of a hydroxy or oxo group, a substituent which is convertible into such a group by hydrolysis, for example an ester, ether, enol, thioenol, acetal or mercaptal group.

The starting compounds may be obtained in various ways. Thus, they can be made by halogenating a corresponding 20-oxo-pregnane derivative in the 17-position and bringing about rearrangement by means of sodium hydrogen carbonate in methanol. Another method of preparation consists in subjecting a 21-halogen-20-oxo-pregnane compound to the action of an alkali alcoholate.

The aforesaid acid halides are reacted in the process of the invention with methylmetallic compounds, for example, those of magnesium, cadmium or zinc. There may also be used compounds of mercury, copper, aluminum, tin or an alkali metal, as well as aliphatic metal halides, for example, of magnesium or zinc. In this way there are obtained directly, inter alia, the methyl-ketones.

The reaction of the acid halides with diazomethane can be carried out with an excess of the latter and in this manner the diazo-ketones are obtained with elimination of hydrogen halide. If, on the other hand, the diazo-methane is gradually added to the acid halide, the hydrohalic acid set free during the condensation reacts with the intermediately formed diazoketone so that the corresponding halogen-ketone is obtained.

In order to replace the halogen atoms or diazo groups in the resulting ketones by hydrogen, any of a large number of reducing agents may be employed, for example, metals such as zinc, copper, magnesium or alloys thereof in the presence of any of a very wide variety of solvents such as alcohols, aqueous alcohols, acetic acid, acetic and hydrohalic acids and alkalies. Moreover, such a reduction can frequently be carried out electrolytically or with hydrogen catalytically activated, for example, with nickel, palladium or platinum. Finally, it is also possible to carry out the reduction by means of aluminum amalgam or sodium amalgam, zinc-palladium, alkali iodides and glacial acetic acid, sodium and alcohols, disubstituted anilines or by means of combinations of these reducing agents. In the reduction of the diazo-ketones, hydrazones are frequently obtained as by-products. The reduction of products containing iodine in the 21-position proceeds especially easily.

In order to form hydroxy ketones, the diazo-ketones so obtained are treated, in the crude state or after isolation and purification, with hydrolyzing agents, for example, with water or dilute acids such, for example, as sulphuric acid, or organic sulphonic acids such as methane sulphonic acid or toluene sulphonic acid. Esters of the hydroxy ketones can be obtained by the reaction of the diazo ketones with organic or inorganic acids having a low water content, especially with acetic acid, but also with propionic acid, butyric acid, crotonic acid, palmitic acid, benzoic acid, phenyl-acetic acid, hydrochloric acid, hydrobromic acid, hydriodic acid, phosphoric acid or boric acid. When halogen ketones are formed as intermediate products these can be converted by means of alkaline agents, for example bicarbonates, into the free hydroxy ketones or by means of salts of the above-mentioned acids into esters thereof. The hydroxy ketones and their esters can also be obtained from the methyl-ketones by means of suitable oxidizing agents, for example, lead tetracylates such as lead tetracetate, or aryl-iodoso acylates. On the other hand, the methyl-ketones can be halogenated in 21-position and the halogen ketones so obtained can be converted into hydroxy ketones or their esters as mentioned above.

In the process of the invention a substituent in the 3-position which is convertible by hydrolysis into an oxo or hydroxy group may be converted into such a group at any desired stage of the process. It is surprising that this hydrolysis is possible without simultaneously converting a halogen atom present in the 21-position into a hydroxy group. The conversion of a free 3-hydroxyl group into an oxo group is effected, for example, by means of an oxidizing agent such as chromic acid in glacial acetic acid or by means of a dehydrogenating agent such as heating with copper powder, or reaction with a metal alcoholate or metal phenolate in the presence of a ketone such as acetone or cyclohexanone.

The intermediate protection of any double bonds present may be brought about, for example, by additive combination with halogen or with a hydrohalic acid or by convertion into the isosteroid.

When it is necessary to introduce a double bond into the 4,5-position this can be brought about in the usual manner, for example, by halogenation followed by the elimination of hydrogen halide.

The following examples illustrate the invention the parts being by weight unless otherwise stated and the relationship of parts by weight to parts by volume being the same as that of the gram to the cubic centimetre. The temperatures are in degrees centigrade.

*Example 1*

1 part of $\Delta^5$-3$\beta$-acetoxy-17$\alpha$-methyl-aetiocholenic acid chloride (melting at 137–140°; obtained from $\Delta^5$-3$\beta$-hydroxy-17$\alpha$-methyl-aetiocholenic acid by acetylation with acetic anhydride in pyridine and subsequent treatment with thionyl chloride) is dissolved in 40 parts by volume of dry ether, and added at −15° to 5 equivalents of diazo-methane. The mixture is maintained at room temperature for 16 hours and then evaporated to dryness under reduced pressure. The crude product melts at 97–101°.

1 part of the resulting crude $\Delta^5$-3$\beta$-acetoxy-17$\alpha$-methyl-20-oxo-21-diazo-pregnene is dissolved in 100 parts by volume of dry ether, and mixed with 5 equivalents of hydrobromic acid in 40 parts by volume of ether. After 30 minutes, the solution is introduced into water while stirring, then extracted with ether, the ethereal layer is washed neutral with water, dried and evaporated, and the crude product is purified by chromatography. The resulting $\Delta^5$-3$\beta$-acetoxy-17$\alpha$-methyl-20-oxo-21-bromo-pregnene melts at 174–175° after recrystallization from a mixture of acetone and petroleum ether.

The 21-chloro derivative prepared in an analogous manner melts at 192–193°.

1 part of $\Delta^5$-3$\beta$-acetoxy-17$\alpha$-methyl-20-oxo-21-chloro-pregnene (or the corresponding 21-bromo-pregnene) is dissolved in 40 parts by volume of glacial acetic acid, wthen mixed with 2 parts of zinc powder, and the whole is heated to 120° for 30 minutes. The reaction product is taken up in ether, the ethereal layer is washed with water and sodium bicarbonate solution until neutral, dried and evaporated. The crude product is recrystallized from a mixture of ether and petroleum ether. In this manner there is obtained $\Delta^5$ - 3$\beta$ - acetoxy - 17$\alpha$ - methyl - 20 - oxo-pregnene which melts at 185–187°.

1 part of the aforesaid compound is dissolved in 20 parts by volume of methanol and heated with 60 parts by volume of a solution of 5 per cent. strength of caustic potash in methanol for 1½ hours to 60°. The reaction mixture is poured into water, extracted with ether, the ethereal solution is washed with water until neutral, dried and evaporated. The crude product is crystallized from a mixture of ether and petroleum ether and there is thus obtained $\Delta^5$-3$\beta$-hydroxy-17$\alpha$-methyl-20-oxo-pregnene melting at 185–187°.

1 part of $\Delta^5$-3$\beta$-hydroxy-17$\alpha$-methyl-20-oxo-pregnene is dissolved in a mixture of 35 parts by volume of benzene and 20 parts by volume of toluene, then mixed with 5 parts by volume of cyclohexanone and 1.5 parts of aluminum tertiary butylate, and the whole is boiled for 15 hours under reflux. The reaction solution is poured into dilute sulphuric acid and the ethereal extract is worked up as described above. The crude product is purified by chromatography. The resulting 17α-methyl-progesterone of the formula

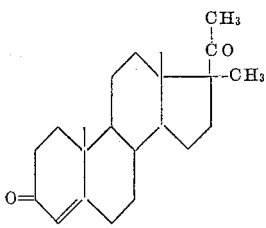

melts at 129–130° after recrystallization from a mixture of acetone and petroleum ether.

*Example 2*

1 part of $\Delta^5$-3β-acetoxy-17α-methyl-20-oxo-21-chloro-pregnene obtained as described above is dissolved in 40 parts by volume of methanol and maintained at room temperature for 12 hours with 2 parts by volume of a solution of 10 per cent. strength of caustic potash in methanol. The reaction product is poured into water, extracted with ether, the ethereal solution is washed with water until neutral, dried and evaporated. The crude product is purified by chromatography and recrystallized from methanol. It is $\Delta^5$-3β-hydroxy - 17α - methyl-20-oxo-21-chloro-pregnene melting at 170–172°.

1 part of the latter compound is dissolved in 80 parts by volume of benzene, then mixed with 5 parts by volume of cyclohexanone, and 3 parts of aluminum tertiary butylate and the whole is boiled under reflux for 16 hours. The solution is mixed with ether, then washed with water until neutral, dried and evaporated, and the crude product is purified by chromatography. After recrystallization from a mixture of ether and petroleum ether the resulting $\Delta^4$-3,20-dioxo-17α-methyl-21-chloro-pregnene melts at 165–166°.

1 part of $\Delta^4$-3,20-dioxo-17α-methyl-21-chloro-pregnene is dissolved in 70 parts by volume of glacial acetic acid, then mixed with 1 part of potassium acetate and 2 parts of potassium iodide, and the whole is boiled under reflux for 2 hours. The reaction mixture is introduced into water while stirring, then neutralized with sodium hydrogen carbonate, extracted with ether, the ethereal layer is washed with water until neutral, dried and evaporated, and the crude product is purified by chromatography. There is obtained 17α-methyl-progesterone which melts at 129–130° after recrystallization from a mixture of ether and petroleum ether.

*Example 3*

1 part of $\Delta^5$-3β-acetoxy-17α-methyl-20-oxo-21-diazo-pregnene is dissolved in 20 parts by volume of methanol and the solution is maintained at room temperature for 12 hours with 60 parts by volume of a solution of 5 per cent. strength of caustic potash in methanol. The reaction solution is cautiously neutralized with acetic acid and evaporated to dryness at a low temperature under reduced pressure.

1 part of the resulting amorphous $\Delta^5$-3β-hydroxy-17α-methyl-20-oxo-21-diazo - pregnene is dissolved in 4 parts by volume of dry benzene and heated with 1 part of benzoic acid for 3 hours at 100°. The reaction solution is poured into water, extracted with ether, and the ethereal layer is washed with water until neutral, dried and evaporated. The crude product is purified by chromatography, and after recrystallization from petroleum ether melts at 169–171°. It is $\Delta^5$-3β-hydroxy-17α-methyl-20-oxo-21-benzoxy-pregnene.

1 part of $\Delta^5$-3β-hydroxy-17α-methyl-20-oxo-21-acetoxy-pregnene obtained in analogous manner by the use of acetic acid instead of benzoic acid is dissolved in 8 parts by volume of toluene and heated with 1 part of aluminum tertiary butylate for 16 hours at 90°. The reaction solution is poured into dilute sulphuric acid, extracted with ether and the ethereal solution is worked up as described above. The 17α-methyl-desoxy-corticosterone acetate so obtained is purified by chromatography, and melts at 163–164° after recrystallization from petroleum ether. By means of a hydrolyzing agent there is obtained therefrom 17α-methyl-desoxy-corticosterone of the formula

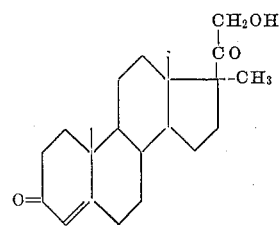

*Example 4*

3.5 parts of $\Delta^5$-3β-acetoxy-17α-methyl-aetiocholenic acid chloride (melting at 137–140°) are dissolved in 100 parts by volume of ether and added dropwise to an ethereal solution of dimethyl cadmium (obtained in the usual manner from 7.6 parts of magnesium shavings, 100 parts by volume of ether, 30 parts of methyl bromide, and 28 parts of cadmium chloride). The reaction mixture is then heated to the boil while stirring for one hour, carefully mixed with dilute acetic acid, and extracted with ether. The ethereal layer is washed with water and a solution of sodium hydrogen carbonate, dried, and evaporated. The crude product is stored in a mixture of 50 parts by volume of methanol and 3.0 parts of potassium hydroxide for 12 hours at 20°. The reaction mixture is diluted with water, extracted with ether, and worked up in the usual manner. The crude product is recrystallized twice from acetone to yield 2.1 parts of pure $\Delta^5$-3β-hydroxy-17α-methyl-pregnene-20-one of melting point 180–182°. The latter is subjected to oxidation with aluminum-tertiary butylate and cyclohexanone in benzene as described in Example 1. It yields 1.3 parts of 17α-methyl-progesterone of melting point 129–130°.

Having thus described the invention, what is claimed is:

1. The $\Delta^4$-17α-methyl-3,20-dioxo-pregnenes.
2. The $\Delta^4$-17α-methyl-3,20-dioxo-pregnene.
3. The $\Delta^4$-17α-methyl-3,20 - dioxo-21-hydroxy-pregnene.
4. The $\Delta^4$-17α-methyl-3,20-dioxo-21 - acetoxy-pregnene.

PLACIDUS A. PLATTNER.

REFERENCES CITED

The following references are of record in the file of this patent:

Plattner, Helv. Chim. Acta 32, 270–275 (1949).